(12) United States Patent
Nielsen et al.

(10) Patent No.: US 10,564,017 B2
(45) Date of Patent: Feb. 18, 2020

(54) ULTRASONIC FLOWMETER AND METHOD USING PARTIAL FLOW MEASUREMENTS

(71) Applicant: Kamstrup A/S, Skanderborg (DK)

(72) Inventors: Søren Tønnes Nielsen, Solbjerg (DK); Jens Lykke Sørensen, Beder (DK); Paul Martin Bendixen, Århus N (DK)

(73) Assignee: Kamstrup A/S, Skanderborg (DK)

( * ) Notice: Subject to any disclaimer, the term of this patent is extended or adjusted under 35 U.S.C. 154(b) by 0 days.

(21) Appl. No.: 16/335,084

(22) PCT Filed: Sep. 19, 2017

(86) PCT No.: PCT/EP2017/073624
§ 371 (c)(1),
(2) Date: Mar. 20, 2019

(87) PCT Pub. No.: WO2018/054896
PCT Pub. Date: Mar. 29, 2018

(65) Prior Publication Data
US 2019/0219429 A1    Jul. 18, 2019

(30) Foreign Application Priority Data

Sep. 21, 2016 (EP) ..................... 16189828

(51) Int. Cl.
*G01F 1/66* (2006.01)
*G01N 29/02* (2006.01)
(52) U.S. Cl.
CPC .............. *G01F 1/668* (2013.01); *G01F 1/662* (2013.01)
(58) Field of Classification Search
CPC .................... G01F 1/66; G01N 29/02
See application file for complete search history.

(56) References Cited

U.S. PATENT DOCUMENTS 6,065,351 A    5/2000  Nagaoka et al.
6,119,070 A    9/2000  Beneteau et al.
(Continued)

FOREIGN PATENT DOCUMENTS

EP            1193476 A1    3/2002
KR      20130070562 A       6/2013
(Continued)

OTHER PUBLICATIONS

The International Search Report and The Written Opinion of the International Searching Authority for Corresponding International Application PCT/EP2017/073624 dated Nov. 16, 2017.
(Continued)

*Primary Examiner* — Jewel V Dowtin
(74) *Attorney, Agent, or Firm* — Renner, Otto, Boisselle & Sklar, LLP

(57) ABSTRACT

Ultrasonic flowmeter for measuring the flowrate of a fluid based on transit times of opposite propagating ultrasonic wave packets, including two ultrasonic transducers arranged at a flow tube for transmitting and receiving the ultrasonic wave packets through a fluid; a control circuit configured for operating the ultrasonic transducers to transmit and receive co-propagating and counter-propagating ultrasonic wave packets, and to determine transit times between transmission and reception of the ultrasonic wave packets; wherein the control circuit is further configured to continuously determine the flowrate of the fluid based on sequential application of separate flow measurement sequences and flow estimation sequences, the flow measurement sequence including transmitting and receiving a co-propagating wave packet and a counter-propagating wave packet, determining a transit time difference between the co-propagating and the counter-propagating wave packets, determining the speed of sound in the fluid, and calculating the flowrate based on the
(Continued)

transit time difference and the speed of sound; and the flow estimation sequence including transmitting and receiving a co-propagating wave packet and/or a counter-propagating wave packet, and based on the co-propagating or the counter-propagating wave packet, determining whether a fluid condition of the fluid has changed since the previous flow measurement.

10 Claims, 2 Drawing Sheets

(56) References Cited

U.S. PATENT DOCUMENTS

| | | | | |
|---|---|---|---|---|
| 7,096,719 | B2* | 8/2006 | Gysling | G01F 1/667 73/19.03 |
| 10,379,084 | B2* | 8/2019 | Nielsen | G01D 4/00 |
| 2006/0169054 | A1* | 8/2006 | Keese | G01F 1/58 73/861.12 |
| 2011/0246098 | A1 | 10/2011 | Takemura et al. | |
| 2014/0238116 | A1* | 8/2014 | Kwan | G01F 1/667 73/61.79 |

FOREIGN PATENT DOCUMENTS

| | | |
|---|---|---|
| WO | 2010122117 A1 | 10/2010 |
| WO | 2013079074 A1 | 6/2013 |

OTHER PUBLICATIONS

The Extended European Search Report for Corresponding Application No. 16189828.3 dated Mar. 27, 2017.

* cited by examiner

ULTRASONIC FLOWMETER AND METHOD USING PARTIAL FLOW MEASUREMENTS

This application is a national phase of International Application No. PCT/EP2017/073624 filed Sep. 19, 2017 and published in the English language, which is an International Application of and claims benefit of priority to Patent Application No. EP 16189828.3, filed on Sep. 21, 2016. The disclosures of the above-referenced applications are hereby expressly incorporated by reference in their entireties.

FIELD OF THE INVENTION

The present invention relates to an ultrasonic flowmeter and a method for measuring the flowrate of a fluid based on transit times of opposite propagating ultrasonic wave packets, and a combination of flow measurement sequences and flow estimation sequences.

BACKGROUND OF THE INVENTION

Meter reading systems, such as automatic meter reading systems (AMR) and advanced meter infrastructure (AMI) systems, are generally known in the art. Utility companies uses such meter reading systems to read and monitor customer utility meters remotely, typically using radio frequency (RF) communication. AMR and AMI systems increase the efficiency and accuracy of collecting readings and managing customer billing.

Utility meters are often denoted smart meters and provided with communication devices for transmitting and receiving RF signal. The communication devices may be configured to periodically transmit data packets including data representing multiple meter readings and other meter data as a function of time.

Good precision, long-term stability, low power consumption and robustness makes utility meters based on ultrasonic time-of-flight technology a widespread choice for monitoring consumption of potable water, hot water, water-based heating and cooling power etc. However, as most ultrasonic flowmeters are battery-powered, strict power management must be enforced in order to keep the average meter power consumption at a minimum. Typical values hereof are between 5 and 50 microamperes supplied from a 3.6 V lithium battery. Another important design criterion for flowmeter devices is the precision of the flow determination.

In a time-of-flight ultrasonic flowmeter the flowrate is determined by clocking the difference in transit times of counter- and co propagating ultrasonic signals. Here, the transit time is considered to be the time an ultrasonic wave front takes to traverse the fluid from transmitting transducer to the receiving transducer. A measure for the transit time is the phase difference, $\Delta\phi$ between two oscillations making up the wave packets. However, determining the flow rate based on phase difference is complicated by the fact that the speed of sound, which is part of the flow rate calculations, is temperature dependent. Consequently, in order to perform an accurate measurement of the flowrate, not only must the phase difference be measured, but also the speed of sound, must be inferred. However, inferring the speed of sound may require substantial data processing, which increases power consumption.

Hence, an improved flowmeter with reduced average meter power consumption would be advantageous, and in particular a flowmeter with reduced data processing and good precision would be advantageous.

OBJECT OF THE INVENTION

It is a further object of the present invention to provide an alternative to the prior art. In particular, it may be seen as an object of the present invention to provide a flowmeter capable of determining fluid flowrate with sufficiently high accuracy based on reduced data processing.

SUMMARY OF THE INVENTION

Thus, the above described object and several other objects are intended to be obtained in a first aspect of the invention by providing an ultrasonic flowmeter for measuring the flowrate of a fluid based on transit times of opposite propagating ultrasonic wave packets comprising: a flow tube with a through-going opening for passage of the fluid between an inlet and an outlet; two or more ultrasonic transducers arranged at the flow tube for transmitting and receiving the ultrasonic wave packets through the fluid; a control circuit configured for operating the ultrasonic transducers to transmit and receive co-propagating and counter-propagating ultrasonic wave packets; wherein the control circuit is further configured to continuously determine the flowrate of the fluid based on sequential application of separate flow measurement sequences and flow estimation sequences, the flow measurement sequences including transmitting and receiving a co-propagating wave packet and a counter-propagating wave packet, determining a phase difference between the received co-propagating and counter-propagating wave packets, determining the speed of sound in the fluid, and calculating the flowrate based on the phase difference and the speed of sound; and the flow estimation sequences including transmitting and receiving a co-propagating wave packet and/or a counter-propagating wave packet, and based on the co-propagating or the counter-propagating wave packet, determining whether a fluid condition of the fluid has changed since the previous flow measurement.

Looking at possible changes in a fluid condition, such as changes in fluid temperature or fluid velocity, since the previous flow measurement, is a power economical methodology for monitoring the flow, not requiring substantial power consuming calculations. If no changes are determined based on the flow estimation there is no need for performing a full flow measurement that requires substantial more power than a flow estimation. Employing such modes while fluid conditions are unchanging will not impact the overall meter accuracy averaged over minutes or longer periods. If on the other hand it is determined that a fluid condition has changed, appropriate processes may be initiated to determine the new flowrate and the new fluid conditions.

The notation transmitting and receiving ultrasonic wave packets may include process known to the skilled person related to transmission and reception of ultrasonic signals, such as excitation of a ultrasonic transducer to transmit and receive ultrasonic signals, digitally sampling an ultrasonic wave packet or signal received at an receiving ultrasonic transducer, etc. Further, as the phase difference and transit time difference are both measures describing the difference in time of flight of two propagating signals, these terms will be used interchangeably throughout the specification.

In one embodiment of the above described ultrasonic flowmeter, at least some of the flow estimation sequences may include determining a change in a fluid condition by comparing samplings of the received co-propagating wave packet and/or counter-propagating wave packet with samplings of the received co-propagating wave packet and/or counter-propagating wave packet transmitted during the previous flow measurement sequence, respectively.

In a digital flowmeter as described above, somewhat involved calculations are often required to extract desired quantities from the recorded signals. Such calculations are relatively expensive in terms of power consumption and battery capacity may thus be saved, if a simplified approach can be deployed to determine whether a change in fluid flowrate and/or temperature has taken place since the last measurement. In the embodiment described above, this determination is made by comparison of current and previous recorded samples before actual calculations are performed.

By digital flowmeter should be understood a flowmeter, where the ultrasonic signal are sampled digitally either by an analog to digital converter (ADC) or by a time-to-digital-converter (TDC). In such meter, representations of the received waveforms can be stored in a microcontroller memory or other memory of the meter for later comparison and processing.

To further reduce power consumption at least some of the flow estimation sequences may including transmitting and receiving only a co-propagating wave packet or a counter-propagating wave packet, and based on the co-propagating or the counter-propagating wave packet determining a change in a fluid condition by comparing the transit time of the co- or counter propagating wave packet with the transit time of the co- or counter-propagating wave packet transmitted during the previous flow estimation sequence, respectively. Further, the flow estimation sequence may include determining a change in a fluid condition by comparing the transit time of the co- or counter-propagating wave packet with the transit time of the co- or counter-propagating wave packet transmitted during the previous flow measurement sequence, respectively.

By comparing the transit times or phase differences of the flow estimation sequence with the transit times or phase difference of the previous flow measurement sequence, the flow measurement sequence is kept as the base line for all flow estimations interleaved between the more accurate flow measurements. Hereby changes in fluid condition since the last flow measurement are identified in a simple manner.

Additionally, in one embodiment a change in fluid condition may be determined by comparing the transit time of the propagating wave packet or the counter-propagating wave packet with an average of the transit times of the propagating wave packets or the counter-propagating wave packets of the last several flow measurements.

In a further embodiment, the co- and counter-propagating wave packets may be used to determine whether a fluid condition of the fluid has changed since the previous flow measurement Furthermore, the consecutive flow estimation sequences may alternate between transmitting and receiving only a co-propagating wave packet or a counter-propagating wave packet.

In a further embodiment of a digital flowmeter as described above, the control circuit may be configured to implement a learning algorithm adapted to identify recurrent periods of substantial constant flow or no flow and during these periods to adjust each flow estimation sequence to alternate between transmitting and receiving only a co-propagating wave packet or a counter-propagating wave packet. Additionally, the co-propagating wave packet and the counter-propagating wave packet may be transmitted with a variable time delay in-between, the time delay being controlled by the learning algorithm.

Additionally, in one embodiment at least some of the flow estimation sequences may include calculating a corrected flowrate based on a ration between the phase difference ($\Delta\phi(t_0)$) calculated during the previous flow measurement sequence and the present phase difference ($\Delta\phi(t)$) between a co- and a counter propagating wave packet transmitted during the flow estimation sequence, under the assumption that the speed of sound (c) in the fluid is identical to the speed of sound determined during the previous flow measurement sequence. Further, at least some of the flow estimation sequences may include determining whether a change in the phase difference is due to a change in flowrate or a change in fluid temperature, based on the phase differences between the present and the previous co-propagating wave packet ($\Delta\theta_1(t)$) and the phase difference between the present and the previous counter-propagating wave packet ($\Delta\theta_2(t)$).

Moreover the flow estimation sequence may include digitally sampling a co- and/or a counter-propagating wave packet at a sample rate lower than the sample rate used in the flow measurements. Additionally, the flow estimation sequence may include transmitting a co- and/or counter-propagating wave packet having a length being shorter than a length of the wave packets transmitted during the flow measurement sequences. Furthermore, the flow estimation sequence may include sampling only a part of a received co-propagating wave packet and/or a counter-propagating wave packet. In addition, a time interval between the application of flow measurement sequences is controlled by changes in fluid condition determined under the flow estimations. Alternatively or additionally a flow measurement sequence may be applied for every 5-10 flow estimation sequence.

The present invention further relates to a method for measuring the flowrate of a fluid based on transit times of opposite propagating ultrasonic wave packets the method comprising the steps of: transmitting and receiving a co-propagating wave packet and a counter-propagating wave packet as part of a flow measurement sequence (fms), the flow measurement sequence further comprising the steps of determining a phase difference ($\Delta\phi$) between the co-propagating and the counter-propagating wave packets, determining the speed of sound (c) in the fluid, and calculating the flowrate (q) based on the transit time difference and the speed of sound; transmitting and receiving a co-propagating wave packet or a counter-propagating wave packet as part of a flow estimation sequence (fes), the flow estimation sequence further comprising determining whether the co-propagating wave packet or the counter-propagating wave packet of the flow estimation sequence differs from the co-propagating wave packet and/or the counter-propagating wave packets of the flow measurement sequence; and repeating the flow measurement sequence if it is determined that the co-propagating wave packet or the counter-propagating wave packet of the flow estimation sequence differ from the co-propagating wave packet and/or the counter-propagating wave packets of the flow measurement sequence, otherwise repeating the flow estimation sequence.

BRIEF DESCRIPTION OF THE FIGURES

The ultrasonic flowmeter and method for determining flowrate according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

The invention can be implemented by means of hardware, software, firmware or any combination of these. The invention or some of the features thereof can also be implemented as software running on one or more data processors and/or digital signal processors. The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Figure 1:
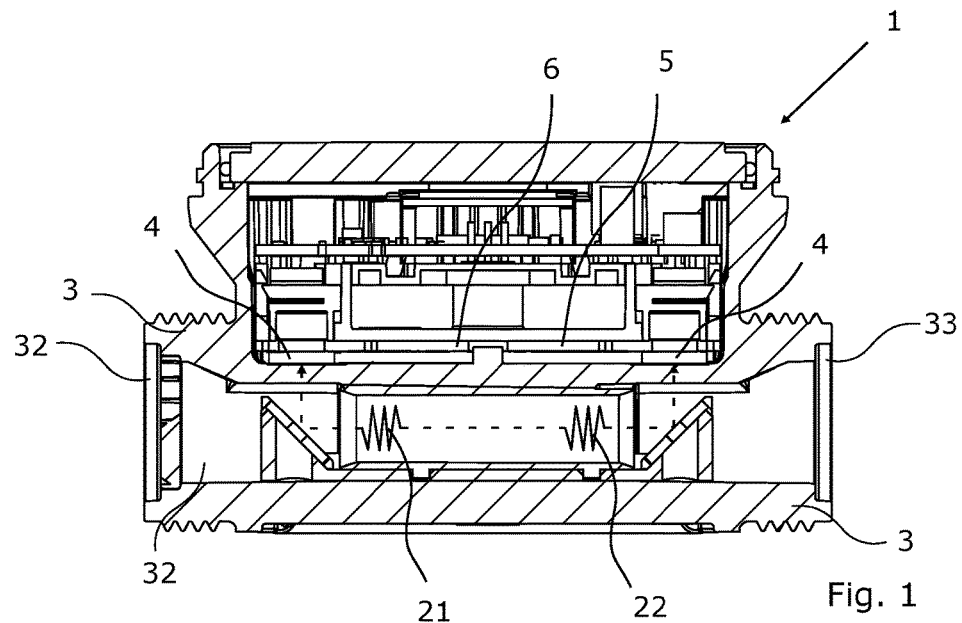
FIG. 1 is a schematic drawing illustrating the an ultrasonic time-of-flight flowmeter according to an embodiment of the invention.

Referring to FIG. 1 an ultrasonic flowmeter 1 for measuring the flowrate of a fluid based on transit times of opposite propagating ultrasonic wave packets 21, 22, is shown. The flowmeter comprises a flow tube 3 with a through-going opening 31 for passage of the fluid between an inlet 32 and an outlet 3. Two ultrasonic transducers 4, in the form of piezoelectric transducers, are arranged at the flow tube 3 for transmitting and receiving the ultrasonic wave packets 21, 22 through a fluid present inside the tube. The ultrasonic transducers are mounted on a printed circuit board 6 and operated by a control circuit 5. The control circuit is configured to operating the ultrasonic transducers to transmit and receive co-propagating wave packets 21 and counter-propagating ultrasonic wave packets 22. The control circuit may also determine transit times between transmission and reception of the ultrasonic wave packets, and transit time differences between different wave packets. Here the transit time is considered the time an ultrasonic wave front takes to traverse the fluid from the transmitting transducer to the receiving transducer.

The flowrate (q) of a fluid running through the flow tube may be determined by clocking the difference in transit times of counter- and co propagating ultrasonic signals or wave packets. Considering two ultrasonic wave packets propagating in opposite direction with respect to the mean flow direction of the running fluid, the transit time difference is described by the phase difference, $\Delta\phi$, between the two oscillations making up the wave packets. As previously described, calculating the flowrate is complicated by the fact that it involves the speed of sound, which in turn changes with the fluid temperature. In summary, the flowrate, q can be expressed as:

$$q = Kc(T)^2 \Delta\phi.$$

Consequently, in order to perform an accurate measurement of the flow rate, not only must the phase difference be measured, but also the speed of sound, $c(T)$ must be inferred.

The speed of sound may be determined based on sampled ultrasonic wave packet by constructing a measure of the mean transit time from two mutually counter-propagating wave packets or indirectly by measuring the fluid temperature. The K in the above equation can be considered a constant scaling factor related to the physical properties of the flowmeter.

Generation and detection of wave packets, determination of phase difference and inference of the speed of sound amounts to a significant current consumption over the typical lifetime of a meter. As previously described it is therefore desirable if some of these processes can be reduced in magnitude or dispensed with, while maintaining an accurate measure of the flowrate through the flow tube. Additionally, the present invention is amongst others based on the appreciation by the inventors that the fluid temperature and consequently the speed of sound is a slowly varying quantity in most installations of which a flowmeter is part. The significant thermal mass of an installation in the form of the fluid occupying the pipes and the pipes themselves inhibit rapid temperature variations. Moreover, in particular in potable water installations, consumption patterns are typically varying a lot during the course of day. Hence, for a significant part of the meter lifetime it will measure a constant speed of sound and a constant flowrate, which most likely is zero. Consequently, it may be unnecessary to spend a lot of battery power at accurately measuring phase differences and inferring the speeds of sound at a high rate, during time periods where the flow rate and other fluid conditions are essentially constant.

To potentially reduce power consumption, the control circuit 5 of the flowmeter is configured to determine the flowrate of the fluid based on sequential application of flow measurement sequences (fms) and flow estimation sequences (fes), respectively. The flow measurement sequence (fms) includes transmitting and receiving a co-propagating wave packet and a counter-propagating wave packet, determining a transit time difference ($\Delta t$) between the co-propagating and the counter-propagating wave packets, determining the speed of sound (c) in the fluid, and calculating the flowrate (q) based on the transit time difference and the speed of sound.

The flow estimation sequence on the other hand may be considered a reduced flow measurement sequence involving reduced flow measurements, resulting in reduced current consumption by the control circuit. In its simplest form, the flow estimation sequence (fes) may include transmitting and receiving a co- or a counter propagating wave packet, and based on the co- or counter propagating wave packet, determining whether a fluid condition of the fluid has changed since the previous flow measurement. Determining whether a fluid condition has changed may be done in a number of ways as will be further elucidated below.

Figure 2:
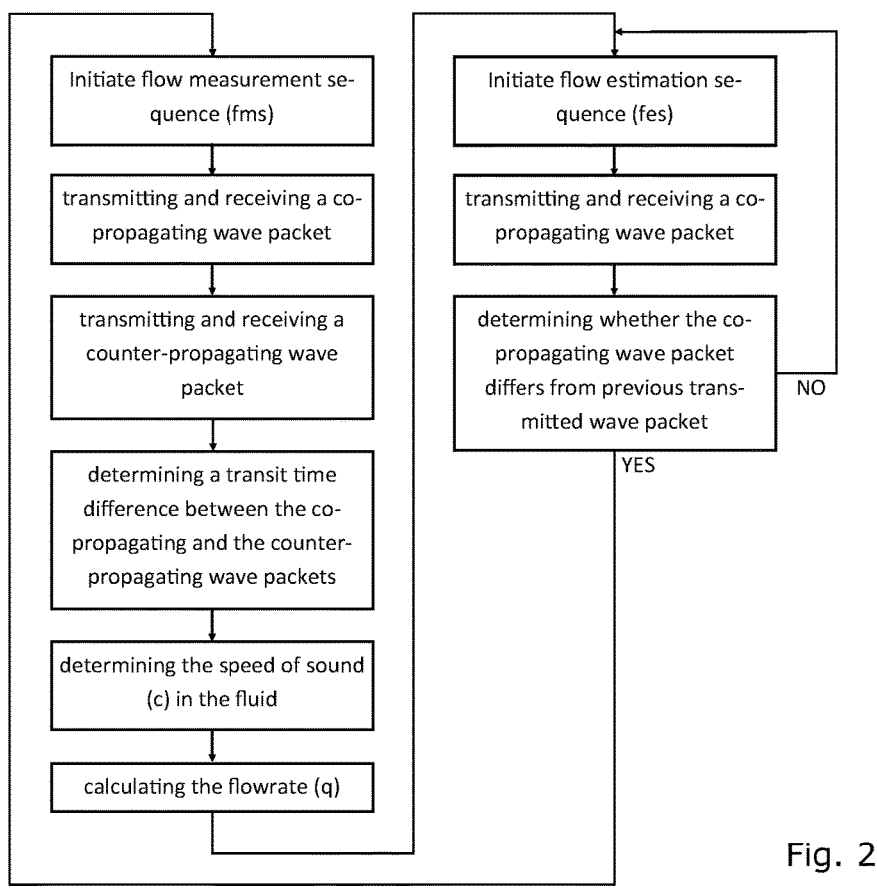
FIG. 2 is a schematic chart illustrating the method for determining flowrate according to an embodiment of the invention.

Referring to FIG. 2, the flow measurement sequences and flow estimation sequences are applied in a specific sequence. A flow measurement sequence may be followed by a plurality of flow estimation sequences. In the illustrated sequence, the number of flow estimation sequences applied between each flow measurement sequence is adaptive and depends on whether significant fluid condition changes are determined during the flow estimation sequences. The time interval between flow measurement sequences may thus be made adaptive to the results of the flow estimation sequence. As an example, the flow estimation sequence described in FIG. 2 includes transmission and reception of only a co-propagating wave packet. However, as described throughout the specification, both co-propagation, counter-propagating and a combination of co- and counter propagating wave packets may be applied during the flow estimation sequences.

In one embodiment, consecutive flow estimation sequences may utilize alternate transmissions of co- and counter propagating wave packets, respectively. More specifically, a first flow estimation sequence following a flow measurement sequence may include transmitting and receiving a co-propagating wave packet and a second flow estimation sequence, following the first flow estimation sequence, may include transmitting a counter-propagating wave packet. A reason for utilizing alternate transmissions of co- and counter propagating wave packets is to be able to detect changes in both flow and temperature based on flow estimation sequences. For a co-propagating wave packets, a reduction in fluid temperature could counteract a flow rate increase, leaving the estimated transit time unchanged. Hereby, if the analysis of flow rate change was based solely on co-propagating wave packets, changes in flowrate could be overlooked.

Figure 3:
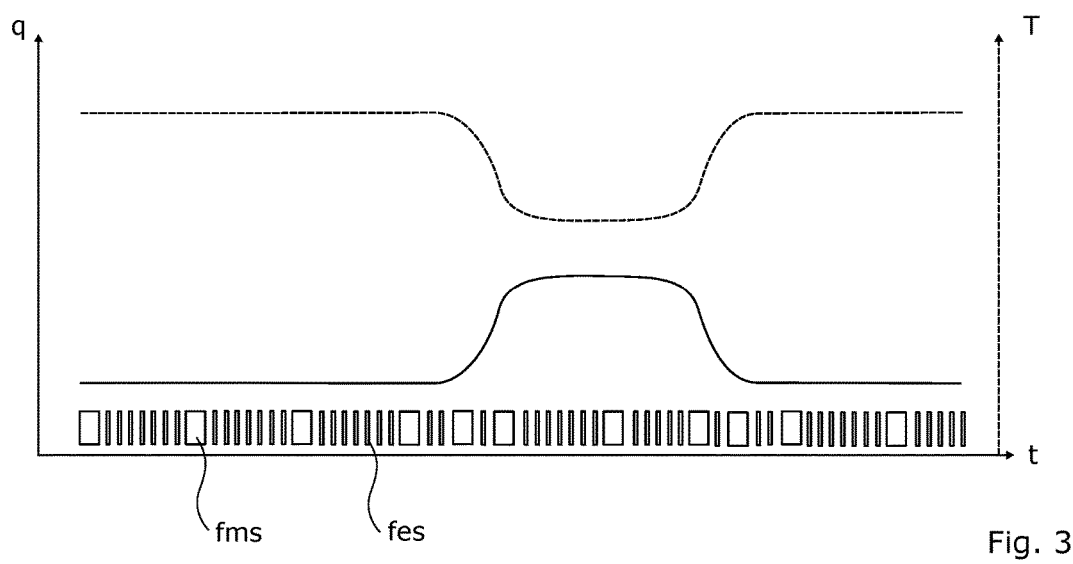
FIG. 3 illustrates how flow measurement sequences and flow estimation sequences are applied in a sequential manner according to changes in fluid flowrate or other fluid conditions.

Referring to FIG. 3, in one embodiment, the time between the flow measurement sequences (fms) may depend on the results of a flow estimation sequence (fes), i.e. the degree of change in flow rate or a fluid temperature. As illustrated in FIG. 3, a flow measurement sequence (fms) may be executed if the fluid flowrate and/or other fluid condition determined during a flow estimation sequence (fes) changes more than a predetermined threshold value. From the figure it is further seen that during changes in the flow rate or fluid temperature, flow measurement sequences (fms) are applied with shorter intervals and during steady periods of constant or near constant flow or temperature, flow measurements sequences are less frequent.

In an alternative embodiment, a predefined sequence alternating between a flow measurement sequence and a number flow estimation sequences is applied, such as 5-10 flow estimation sequences for every measurement sequence. Further, the time interval and/or the number of flow estimation sequences between each flow measurement sequence may be adjusted according to a presumed consumption pattern or a consumption pattern estimated over a previous time period.

Having described the concept of flow measurements interleaved with flow estimations. Various ways of performing flow estimations will be described in the following. In an ultrasonic flow meter transmitted wave packets are received by the receiving ultrasonic transducer and subsequently digitally sampled by the control circuit to obtain a sampled wave packet, i.e. a list of samples characterizing the received wave packet. Comparing one or more individual samples of a list is a simple and power-economical methodology for determining whether one wave packet differ from a previous wave packet and thus whether a fluid condition has changed. In one embodiment, a fluid condition change is determined by comparing two sampled wave packets, such as the co-propagating wave packet of the flow estimation sequence and the co-propagating wave packet transmitted during the most recent flow measurement sequence. In another embodiment, both co- and counter-propagating signals may be compared to determine fluid condition changes.

Mathematically, the comparison is made by calculating a simple difference, M between the signal representing the flow measurement wave packet, being a reference signal (x), and the signal representing the flow estimation wave packet, being the present signal (y). In an example based on simple quantities, independent of the signal amplitude, x-values are related to the reference signal and y-values are related to the present signal:

$$M = \frac{\sum_k |y[k] - x[k]|}{\sqrt{\sum_k y[k]^2 + x[k]^2}}$$

By comparing the calculated difference, M to a threshold value, $M_t$, previously established to be representative of an appreciable change in fluid conditions, it can be established if changes in fluid conditions have taken place, and a full flow measurement is required, as will be further described below. The number of samples of a sampled signal used for calculating the difference, M may also be varied, and different flow estimation sequences may use a different number of samples.

If a more accurate flow estimation is required, the difference between two consecutive co-propagating signal, $M_1$ and the difference between two consecutive counter-propagating signals, $M_2$ may be calculated.

$$M_1 = \frac{\sum_k |y_1[k] - x_1[k]|}{\sqrt{\sum_k y_1[k]^2 + x_1[k]^2}}, \quad M_2 = \frac{\sum_k |y_2[k] - x_2[k]|}{\sqrt{\sum_k y_2[k]^2 + x_2[k]^2}}.$$

Here $x_1$ and $x_2$ denotes reference signals recorded earlier, and $y_1$ and $y_2$ denotes resent signals. Indices 1 and 2 refer to signal associated with co- and counter propagating wave packets, respectively.

In a one embodiment the difference $M_1$ may be calculated between a co-propagating signal transmitted during a flow measurement sequence and a subsequent co-propagating signal transmitted during a following flow estimation sequence, and difference $M_2$ may be between a counter-propagating signal transmitted during a flow measurement sequence and a following counter-propagating wave packet transmitted during a flow estimation sequence.

Alternatively, the cross correlation between reference signal values (x) and present signal values (y) is used to compare sampled signals. Still, indices 1 and 2 refer to signal associated with co- and counter propagating wave packets, respectively.

The normalized cross correlation is given by:

$$C_1(l) = \frac{\sum_k y_1[k-l]x_1[k]}{\sqrt{(\sum_k y_1[k-l]y_1[k-l])(\sum_k x_1[k]x_1[k])}},$$

Similar to the previous comparison described, the cross correlation ($C_1(l)$ and $C_2(l)$) may be calculated for either one or both of the co- and counter propagating signals. A change in flowrate and/or temperature of the fluid may be determined by calculating the cross correlation, $C_1(0)$ at zero displacement. For identical signals or wave packets, this is exactly one, and it is assumed that no changes in fluid condition has occurred. On the contrary, if the cross correlation deviates from 1, this indicates a change in fluid conditions.

Calculation of the cross correlation may also be used to determine a phase difference, $\Delta\phi(t)$ between a present co- and counter propagating signal. This is done by calculating the cross correlation, $C_1(I)$ and/or $C_2(I)$, for different time displacement values, I, whereby the displacement value, $I_{max}$ resulting in a cross correlation of 1 may be identified. Based on the displacement value, $I_{max}$, the present phase difference, $\Delta\phi(t)$ may be calculated form equation:

$$q = Kc(T)^2 \Delta\varphi(t) = \frac{\omega I_{max}}{f_{sample}}$$

Where $\omega$ is the angular frequency of the ultrasonic oscillations and $f_{sample}$ is the sample frequency.

The ratio between the present phase difference, $\Delta\phi(t)$ and the phase difference, $\Delta\phi(t_0)$ found during the previous flow measurement may then be used to correct the previous flowrate according to the below equation, and under the assumption that fluid temperature is constant:

$$q(t) = q_0 \frac{\Delta\varphi(t)}{\Delta\varphi(t_0)} \quad \text{(Eq. 1)}$$

Another way of determining a change in a fluid condition is by looking at the phase difference between two consecutive co- or counter propagating wave packets taken at $t_0$ and t. More specifically the phase difference, $\Delta\theta_1(t)$ between a co-propagating wave packet transmitted during a flow measurement sequence and a following co-propagating wave packet transmitted during a flow estimation sequence, and the phase difference, $\Delta\theta_2(t)$ between a counter-propagating wave packet transmitted during a flow measurement sequence and a following counter-propagating wave packet transmitted during a flow estimation sequence. As envisaged by the skilled person, the above mentioned phase differences $\Delta\theta_1(t)$ and $\Delta\theta_2(t)$ may also be calculated between following co-propagating wave packets and following counter-propagating wave packets transmitted during following flow estimation sequences.

By subtracting the phase differences $\Delta\theta_1(t)$ and $\Delta\theta_2(t)$ we form the following:

$$\Delta\theta_2(t) - \Delta\theta_1(t) = \theta_2(t) - \theta_2(t_0) - [\theta_1(t) - \theta_1(t_0)] = \Delta\varphi(t) - \Delta\varphi(t_0),$$

from which $\Delta\phi(t)$ may be derived:

$$\Delta\varphi(t) = \Delta\varphi(t_0) + \Delta\theta_2(t) - \Delta\theta_1(t).$$

Calculating the present phase difference, $\Delta\phi(t)$ based on the phase differences $\Delta\theta_1(t)$ and $\Delta\theta_2(t)$ offers a power saving potential as the latter phase differences often are requires less processing power to determine. In general, smaller phase differences can be determined relatively easily whereas greater differences require more complex calculations and thus more processing power to determine. As the phase differences $\Delta\theta_1(t)$ and $\Delta\theta_2(t)$ relate to changes in flowrate these are often smaller than the phase difference $\Delta\phi(t)$ related to the magnitude of the flowrate.

Additionally, calculation of the cross correlation of to both co- an counter propagating wave packets, $C_1(I)$ and $C_2(I)$, may be used to determine whether a change in fluid condition is caused by changes in flow rate or fluid temperature. If the fluid temperature has changed this will reflect a similar change in $\Delta\phi(t)$ found based on the co- and counter propagating signal, respectively, and the phase difference $\Delta\phi(t_0)$ previously found based on the reference co- and counter propagating signal. If on the other hand, the change in $\Delta\phi(t)$ is opposite for the co- and counter propagating signals, this indicates a change in the flowrate.

Having determined the phase difference, $\Delta\phi(t)$, the flowrate is calculated using the previous mentioned Eq. 1. Hereby the new flowrate is calculated based on phase differences determined during the flow estimation sequence, under the assumption that the speed of sound is unchanged. Calculating the flowrate without determining the speed of sound in the fluid reduces processing power spend even further.

Having described various ways for estimating flowrate and changes in fluid conditions, it will be described in the following how the concept of flow estimation influences flow measurement accuracy. The phase difference between a set of subsequent co-propagating wave packets, $\Delta\theta_1(t)$ and a set of counter propagating wave packets, $\Delta\theta_2(t)$ can be found based on the below equations, respectively:

$$\theta_1(t) = \frac{\omega L}{(c(T) + v)}; \quad \theta_2(t) = \frac{\omega L}{(c(T) - v)}$$

where L is the physical distance separating the ultrasonic transducers, $\omega$ is the angular frequency of the ultrasonic oscillations, T is the fluid temperature, c is the speed of sound and v is the fluid velocity. By inspecting the first order Taylor expansions of these, the following is obtained:

$$\Delta\theta_1(t) = -\frac{\omega L}{(c+v)^2}\left(\frac{\partial c}{\partial T}\Delta T + \Delta v\right); \quad \text{(Eq. 2)}$$

$$\Delta\theta_2(t) = -\frac{\omega L}{(c-v)^2}\left(\frac{\partial c}{\partial T}\Delta T - \Delta v\right)$$

$\Delta T$ and $\Delta v$ denote changes in the fluid temperature and velocity respectively, between $t_0$ and t. From this it can be seen that the size of $\Delta\theta_1(t)$ and $\Delta\theta_2(t)$ can be used to estimate the change of fluid conditions since that last full flow measurement and hence these quantities can be used to govern when another full flow measurement is required. Further, by expanding the denominators to first order in v/c and rearranging terms we find $$\Delta\theta_2 - \Delta\theta_1 = \Delta\varphi(t_0)\left[\frac{\Delta v}{v} - 2\left(c^{-1}\frac{\partial c}{\partial T}\right)\Delta T\right]; \quad \text{(Eq. 3)}$$

$$\Delta\theta_2 + \Delta\theta_1 = \frac{2\omega L}{c}\left[2\frac{v}{c}\frac{\Delta v}{v} - \left(c^{-1}\frac{\partial c}{\partial T}\right)\Delta T\right]$$

Figure 4:
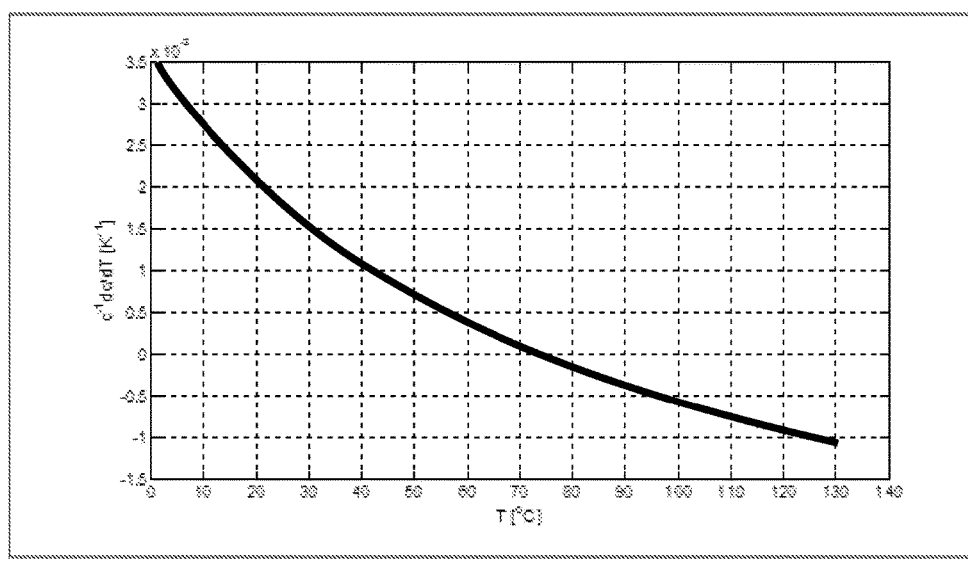
FIG. 4 shows a graph illustrating the relationship between speed of sound and fluid temperature.

For realistic flow velocities, v/c is bounded by the interval running between 0 and 0.007. Hence, the term $2(v/c)(\Delta v/c)$ in the second square brackets of Eq.'s 3 is at the level of $10^{-6}$ $10^{-5}$. FIG. 4 shows the behavior of the second term in the bracket.

Based on Eq. 3 it may be concluded that $\varepsilon = \Delta\theta_2 + \Delta\theta_1$ is much more sensitive to changes in temperature than changes in flow velocity, inside temperature intervals associated with the supply of potable water. Hence, it is advantageous to use this quantity as an indicator of the error picked up by the temperature change between $t_0$ and t. Setting an upper tolerable value of $|\varepsilon| \approx 0.1$ radians, we find by insertion in the $\Delta\theta_2 - \Delta\theta_1$ expression of Eq.'s 3:

$$\Delta\theta_2 - \Delta\theta_1 = \Delta\varphi(t_0)\frac{\Delta v}{v} + 2\varepsilon\frac{v}{c} \quad \text{(Eq. 4)}$$

Using v/c=0.007, we find a maximum phase difference error of 1 mrad corresponding to approximately 0.06 degrees. Comparing this to typical phase differences on the order of 100's of degrees for this value of v/c, the error associated with the chosen limit of E is seen to be negligible. Moreover, the sign of this error is expected to be arbitrary, why such errors quickly averages to zero as the consumption meter acts as an integrator. Still further, changes in temperature can be compensated for by using $$\Delta\theta_2 - \Delta\theta_1 - 2\varepsilon\frac{v}{c} \text{ for } \Delta\Delta\phi.$$

Moreover, under particularly stable fluid conditions fluid estimations may be performed based on alternation between generating and digitizing co- and counter propagating signals spaced by relatively long time differences, such as 0.1 to 10 seconds. Here flow rate is calculated based on the present phase difference, $\Delta\phi(t_2)$ found by alternately using the blow equations, in combination with Eq. 1 as described earlier:

$$\Delta\phi(t_2)=\Delta\phi(t_0)+\Delta\theta_2(t_2)-\Delta\theta_1(t_1)$$

$$\Delta\phi(t_2)=\Delta\phi(t_0)+\Delta\phi_2(t_1)-\Delta\phi_1(t_2)$$

Here $t_0$, $t_1$ and $t_2$ are all different and $t_0 < t_1 < t_2$. In an exemplary embodiment to may be the time associated with the previous flow measurement, $t_1$ the time associated with the previous flow estimation based on a co- or counter propagating signal and $t_2$ the time associated with the present flow estimation based on a co- or counter propagating signal.

Still further, in embodiments of an ultrasonic flowmeter comprising a temperature sensor for measuring the temperature of the fluid, the phase differences $\Delta\theta_1(q_{ref},T)$ and $\Delta\theta_2(q_{ref},T)$ may be infered based on the measured temperature at a reference flowrate, $q_{ref}$. The reference flowrate, $q_{ref}$ may advantageously be chosen to be zero and the deviation of the actually measured values of $\Delta\theta_1(q,T)$ and/or $\Delta\theta_2(q,T)$ form the reference flowrate phase differences, is then attributed only to a deviation of the actual flowrate from zero. This can be utilized to evaluate the actual flowrate, as it is noted that the phase deviation $\Delta\theta_2(q,T)-\Delta\theta_2(q_{ref},T)$ is half of the $\Delta\phi(t)$ appearing in the flow estimation Eq. 1. Furthermore, since the fluid temperature is actually measured, the variation in the speed of sound due to changes in T can be readily taken into account in the flow calculation below:

$$q=Kc(T)^2\Delta\phi=-2Kc(T)^2[\Delta\theta_1(q,T)-\Delta\theta_1(q_{ref},T)]=2Kc(T)^2[\Delta\theta_2(q,T)-\Delta\theta_2(q_{ref},T)]$$

As described above the use alternating use of co- and counter propagating signals may be sufficient to establish a reliable measure of the flowrate under special fluid conditions, while reducing current consumption by the meter even further. Such special fluid conditions may be present in periods of substantial constant flow or no flow, such as during nighttime or in other periods exhibiting low flow rates.

In one embodiment, the control circuit may be provided with a learning algorithm, allowing the meter to adapt the flow estimations according to the consumption pattern of a preceding period of time. More specifically the number of signals transmitted in each direction and the time interval between signal transmission may be further reduced in periods of constant or no flow.

The above described flow estimation and associated determination of changes in fluid condition may be performed based on sampling of the signals or wave packets at or below the Nyquist limit. Hence, a further advantage in terms of reduced power consumption may thus be achieved by choosing sample rates for the flow estimation sequence lower than the sample rates for the flow measurement sequence. In one embodiment the sample rate used in the flow estimation sequence may be at or below 50% of the Nyquist limit. In addition, the sample rate used in the flow estimation sequence may be 50%-75% of the sample rate used in the flow measurement sequence.

Additionally the length of the ultrasonic wave packet generated during the flow estimation sequence may be shorter than a length of the wave packets transmitted during the flow measurement sequences. In one embodiment the wave packet length used in the flow estimation sequence may be 50%-75% of the wave packet length used in the flow measurement sequence. Furthermore, in the flow estimation sequence only a part of a wave packet received at a receiving transducer may be sampled to reduce power consumption.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An ultrasonic flowmeter for measuring the flowrate of a fluid based on transit times of opposite propagating ultrasonic wave packets, comprising:
   a flow tube with a through-going opening for passage of the fluid between an inlet and an outlet;
   two or more ultrasonic transducers arranged at the flow tube for transmitting and receiving the ultrasonic wave packets through the fluid;
   a control circuit configured for operating the ultrasonic transducers to transmit and receive co-propagating and counter-propagating ultrasonic wave packets;
   wherein the control circuit is further configured to continuously determine the flowrate of the fluid based on sequential application of separate flow measurement sequences and flow estimation sequences:
   the flow measurement sequences including transmitting and receiving a co-propagating wave packet and a counter-propagating wave packet, digitally sampling the received wave packets and storing the sampled wave packets in a memory associated with the control circuit, determining a phase difference between the wave packets, determining the speed of sound in the fluid, and calculating the flowrate based on the phase difference and the speed of sound; and
   the flow estimation sequences including alternately transmitting and receiving at least a co-propagating wave packet or a counter-propagating wave packet, digitally sampling the received wave packet and comparing the sampled wave packet with the corresponding sampled co-propagating wave packet or sampled counter-propagating wave packet, obtained during the previous flow measurement sequences, to determining whether a fluid condition of the fluid has changed since the previous flow measurement.

2. The ultrasonic flowmeter according to claim 1, wherein at least some of the flow estimation sequences include calculating a corrected flowrate based on a ratio between the phase difference calculated during the previous flow measurement sequence and the present phase difference between the co-propogating and counter propagating wave packets transmitted during the flow estimation sequence, under the assumption that the speed of sound in the fluid is identical to the speed of sound determined during the previous flow measurement sequence.

3. The ultrasonic flowmeter according to claim 1, wherein at least one of the flow estimation sequences includes calculating the present phase difference based on the phase difference calculated during the previous flow measurement sequence and the phase differences between the present and the previous co-propagating wave packets and/or the present and the previous counter-propagating wave packets, under the assumption that the speed of sound in the fluid is substantially identical to the speed of sound determined during the previous flow measurement sequence.

4. The ultrasonic flowmeter according to claim 1, wherein at least one of the flow estimation sequences includes determining whether a change in the phase difference is due to a change in flowrate or a change in fluid temperature, based on the phase differences between the present and the previous co-propagating wave packets and the phase difference between the present and the previous counter-propagating wave packets.

5. The ultrasonic flowmeter according to claim 1, wherein the flow estimation sequences alternate between transmitting and receiving only the co-propagating wave packet or the counter-propagating wave packet.

6. The ultrasonic flowmeter according to claim 1, wherein at least one of the flow estimation sequences includes digitally sampling the co-propagating wave packet and/or the counter-propagating wave packet at a sample rate lower than the sample rate used in the flow measurement sequences.

7. The ultrasonic flowmeter according to claim 1, wherein the co-propagating wave packet and/or the counter-propagating wave packet transmitted during at least one of the flow estimation sequences is shorter in length than the wave packets transmitted during the flow measurement sequences.

8. The ultrasonic flowmeter according to claim 1, wherein at least one of the flow estimation sequences includes sampling only a part of the received co-propagating and/or counter-propagating wave packets.

9. The ultrasonic flowmeter according to claim 1, wherein a time interval between application of flow measurement sequences is controlled by changes in fluid condition determined under the flow estimation sequences.

10. A method for measuring the flowrate of a fluid based on transit times of opposite propagating ultrasonic wave packets, the method comprising the steps of:

implementing a flow measurement sequence including:
transmitting and receiving a co-propagating wave packet and a counter-propagating wave packet,
digitally sampling the received wave packets and storing the sampled wave packets in a memory,
determining a phase difference between the received wave packets,
determining the speed of sound in the fluid, and
calculating the flowrate based on the phase difference and the speed of sound; and implementing a flow estimation sequence including:
alternately transmitting and receiving at least a co-propagating wave packet or a counter-propagating wave packet,
digitally sampling the received wave packet and comparing the sampled wave packet with the corresponding sampled co-propagating wave packet or sampled counter-propagating wave packet obtained during the previous flow measurement sequences to determine whether the wave packet of the flow estimation sequence differs from the corresponding wave packet of the flow measurement sequence, and
repeating the flow measurement sequence if the difference between the sampled wave packet of the flow estimation sequence and the corresponding sampled wave packet of the flow measurement sequence is indicative of a change in a fluid condition of the fluid, otherwise repeating the flow estimation sequence.

* * * * *